(12) United States Patent
Wessels et al.

(10) Patent No.: US 7,429,830 B2
(45) Date of Patent: Sep. 30, 2008

(54) POWER CONTROL OF A FLUORESCENT LAMP

(75) Inventors: Johannes Hendrik Wessels, Eindhoven (NL); Arnold Willem Buji, Eindhoven (NL); Geert Willem Van Der Veen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 44 days.

(21) Appl. No.: 11/573,900

(22) PCT Filed: Jul. 27, 2005

(86) PCT No.: PCT/IB2005/052526

§ 371 (c)(1),
(2), (4) Date: Feb. 19, 2007

(87) PCT Pub. No.: WO2006/021901

PCT Pub. Date: Mar. 2, 2006

(65) Prior Publication Data

US 2008/0012503 A1    Jan. 17, 2008

(30) Foreign Application Priority Data

Aug. 24, 2004    (EP)    ................... 04104051

(51) Int. Cl.
*H05B 37/02* (2006.01)

(52) U.S. Cl. .................. 315/224; 315/291; 315/307; 315/297; 315/225

(58) Field of Classification Search ................. 315/224, 315/225, 291, 307, 297, 209 R
See application file for complete search history.

(56) References Cited

U.S. PATENT DOCUMENTS

| 5,670,849 A | 9/1997 | Melai |
| 5,770,926 A | 6/1998 | Choi et al. |
| 6,011,360 A | 1/2000 | Gradzki et al. |
| 2002/0101187 A1 | 8/2002 | Buji et al. |
| 2003/0160576 A1* | 8/2003 | Suzuki ................... 315/291 |

FOREIGN PATENT DOCUMENTS

WO    0237904 A1    5/2002

\* cited by examiner

*Primary Examiner*—Tuyet Vo

(57) ABSTRACT

A fluorescent lamp (2), in particular a backlight lamp of a display device, is supplied with an alternating voltage, a frequency and an amplitude of which being greater during ignition than during normal operation of the lamp. The voltage (V) across the lamp and the current (I) through the lamp are measured to provide a measured voltage value and a measured real lamp current value. From the alternating voltage there is derived a voltage (V2). The measured voltage value is multiplied by the sum of the measured real lamp current value and the derived voltage. The multiplication result (P=V*(I+V2)) is compared with a reference value (Ref), which results in a difference or error value. The error value is used to control the frequency and the amplitude of the alternating voltage (V), such that the error value is minimized.

5 Claims, 1 Drawing Sheet

POWER CONTROL OF A FLUORESCENT LAMP

FIELD OF THE INVENTION

The invention relates to a method and to a ballast circuit for supplying a fluorescent lamp and for controlling its power as described in the preambles of claim 1 and claim 3 respectively. In particular the lamp is used for backlight of a liquid crystal display (LCD).

BACKGROUND OF THE INVENTION

A method of said type is disclosed by WO 02/37904. With the prior art method the current through the lamp and the voltage across the lamp is measured, sampled and converted to digital values. At each sample time a multiplier multiplies the current value and the voltage value to provide a value for the power which the lamp consumes at that time. The calculated power value is compared with a reference value to provide a first error signal. The first control voltage value is memorized. A second memorized control voltage value was memorized at a preceding sample time. Depending on the signs and the magnitudes of the first and second control voltages a multiplication factor is determined. The first error signal and the product of the second control voltage and said factor are added to provide a combined control voltage. The combined control voltage is used to control a frequency or duty cycle of a high frequency square wave voltage which is supplied to the lamp is operated, such that the first error signal is minimized. The use of said combined control voltage instead of the first control voltage only is to make the control loop stable and at the same time to provide a comparatively quick response for a very wide range of parameters, such as power consumed by the lamp or the ambient temperature (see document page 7 lines 19-21).

Said advantage of quick response turns out to be a disadvantage for a lamp which is operated in a so-called scanning mode, such as in LCD television sets. In that case an LCD display of a television set comprises several longitudinal fluorescent tube lamps, with each lamp being turned on and off alternately to prevent that a viewer experiences a smearing effect on images shown by the display. As an example, the refresh rate of the lamps may be 75 Hz with an on-time of 3 ms and an off-time of 10 ms. This means that each lamp must be re-ignited every 1/75 second. Usually, an ignition voltage and an ignition frequency of the high frequency voltage supplied to a lamp is considerably higher than during normal operation. In more detail, as the error signal becomes larger, the high frequency of the voltage supplied to the lamp is increased. At the time of turning on of the lamp the measured current is zero and thus the calculated power is zero and the error is maximum. As a consequence the power taken by the lamp during ignition is greater than during normal operation. In addition, sudden on switching of the lamp may easily cause overshoots of the power applied to the lamp. In turn this causes a heavy electron bombardment of the electrodes and therefor it reduces the lifetime of the lamp. Said disadvantages are more significant. As a whole said disadvantages will reduce the lifetime of the lamp to an extent which is unacceptable for use in television sets.

OBJECT OF THE INVENTION

It is an object of the invention to solve the drawback of the prior art method as described above.

SUMMARY OF THE INVENTION

The above object of the invention is achieved by providing a method as described in claim 1.

With the method according to the invention there will always be a value for the calculated power available. This will limit the maximum voltage across the lamp from the start of the ignition process with a fast response, while the ignition is remained reliable and its control is smoothened. When turning from an ignition state to a normal operation state of the lamp the voltage across the lamp decreases, while the lamp current increases, so that the contribution of the additional term of the control signal on the control of the lamp power is relatively small.

The above object of the invention is also achieved by providing a ballast circuit as described in claim 3.

BRIEF DESCRIPTION OF THE DRAWINGS

The invention will become more gradually apparent from the following exemplary description in connection with the accompanying drawing. In the drawing.

DETAILED DESCRIPTION OF EXAMPLES

Figure 1:
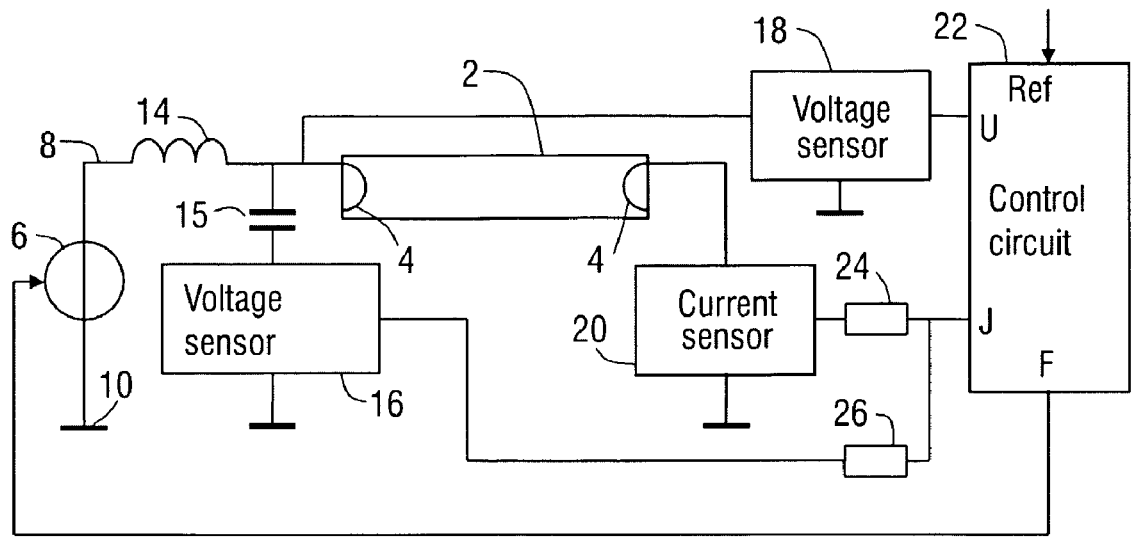
FIG. 1 shows a diagram of a ballast circuit of a fluorescent lamp according to the invention.

The ballast circuit shown by the diagram of FIG. 1 comprises a fluorescent lamp 2 having two cathodes 4. In particular, the circuit shown in FIG. 1 is used to provide a backlight in a display device, for example a liquid crystal display (LCD). The LCD may be part of a television set comprising several of such backlight lamps 2.

Preferably each lamp 2 of said lamps is a hot cathode compact fluorescent lamp (HCFL). A lamp 2 of this type can emit more light than a cold cathode fluorescent lamp (CCFL), so that the LCD may provide brighter images. In turn, this allows the LCD to be driven in a so-called scanning mode in which the lamps are turned on and off alternately to prevent that a viewer experiences a smearing effect on images shown by the display. As an example, the refresh rate of the lamps may be 75 Hz with an on-time of 3 ms and an off-time of 10 ms. This means that each lamp must be re-ignited every 1/75 second.

The ballast circuit shown in FIG. 1 further comprises a square wave generator 6 for providing a square wave voltage across a terminal 8 and a terminal, indicated as mass 10, an inductor 14 connected between terminal 8 and a first cathode 4 of the lamp 2, a series circuit of a capacitor 15 and a voltage sensor 16 connected between said first cathode 4 and mass, a voltage sensor 18 connected between said first cathode 4 and mass, a current sensor 20 connected between the second cathode 4 of the lamp and mass 10 and a control circuit 22, such as the UBA2010 control IC of Philips.

The inductor 14 and the capacitor 15 provide a resonant circuit, the node of which supplies a high frequency filtered voltage at the first cathode 4 of lamp 2, with the amplitude of said voltage being dependent on the frequency.

The generator can be a half-bridge driver, such as the UBA2024 of Philips, comprising a series of two switches which are turned on and off alternately at a high frequency of for example 50 kHz. Said frequency is dependent on electronic components which are external to the generator 6.

A voltage sense input U of the control circuit 22 is connected to the voltage sensor 18 to sense the voltage across the lamp 2, that is between the first cathode 4 and mass 10 in this embodiment.

A current sense input J of the control circuit 22 is connected to the current sensor 20 via a resistor 24 to sense the current through the lamp 2.

A reference input Ref of the control circuit 22 receives a reference signal from a reference signal source (not shown).

An output F the control circuit 22 is connected to an input of the generator 6 by which the generator 6 receives a control signal which controls the frequency, or possibly the duty cycle, of the square wave voltage supplied by the generator 6.

The control circuit 22 samples the signals at its U and J inputs with a sampling rate and it rectifies and multiplies each pair of samples taken at a time to provide a value for the power and thus of the brightness (lumen) of the lamp. With the reference signal supplied to input Ref representing a wanted power value, the control circuit 22 compares the calculated power value and the wanted power value. If a difference or error between said compared values is not zero, the control circuit changes the control signal supplied to its output F to minimize said error. The greater said error, the greater the frequency of the square wave voltage from the generator 6, and, with a non-linear relation, the greater the amplitude of the voltage at the first cathode 4 of the lamp.

At the start of ignition the lamp current is zero and therefore said error is maximum. This will result in a high voltage across the lamp each time the lamp 2 is ignited. The sudden on switching of the lamp may easily cause overshoots of the voltage applied to the lamp and therefore heavy electron bombardments of the electrodes of the lamp. This reduces the lifetime of the lamp 2. In particular in case the lamp 2 is a HCFL and being operated in scanning mode, as described above, the lifetime of the lamp 2 can be reduced considerably.

With a current flowing through the lamp 2 after its ignition the calculated power of the lamp will no longer be zero, so that said error is smaller and the frequency and the amplitude of the square wave voltage will drop. The amplitude during ignition may be five times higher than during normal operation of the lamp 2.

To prevent said reducing of the lifetime of the lamp 2, according to the invention, the current sense input J is also connected via a resistor 26 to some node of the circuit which represents a measured portion of the voltage across the lamp 2 at some time during a cycle of the voltage supplied to the lamp 2. In the embodiment shown in FIG. 1 said measured voltage portion is provided by voltage sensor 16.

Accordingly, at input J of control circuit 22 there will be a signal which represents the current I through the lamp 2 plus some amount V2, with |V2|<|V|, which is determined by the amplitude of the square wave voltage and which simulates a lamp current. As described above, the controller 22 rectifies and multiplies samples at its inputs J and U. Thus, the controller 22 calculates a value for the power P of the lamp as $P=V*(I+V2)$ (with correction for dimensions in this and other formulae). At the start of ignition the lamp current I will be zero, so that $P=V*V2$, which is unequal to zero. As a result the voltage amplitude at the first cathode 4 of the lamp 4 generated at this instant will be lower than maximum.

During normal operation the influence of the term $V*V2$ will be small since at that time the amplitude of the voltage at the first cathode 4 will be about five times smaller than during ignition. If V and V2 have identical phases V=V2, so that said term becomes $V^2$, which shows that it reduces at a squared rate with reducing V, when evolving from the ignition state to the normal operating state. Yet, during ignition its influence may be sufficient to limit the amplitude of the voltage across the lamp 2 with a fast response, while remaining a reliable control of said amplitude during normal operation.

Figure 2:
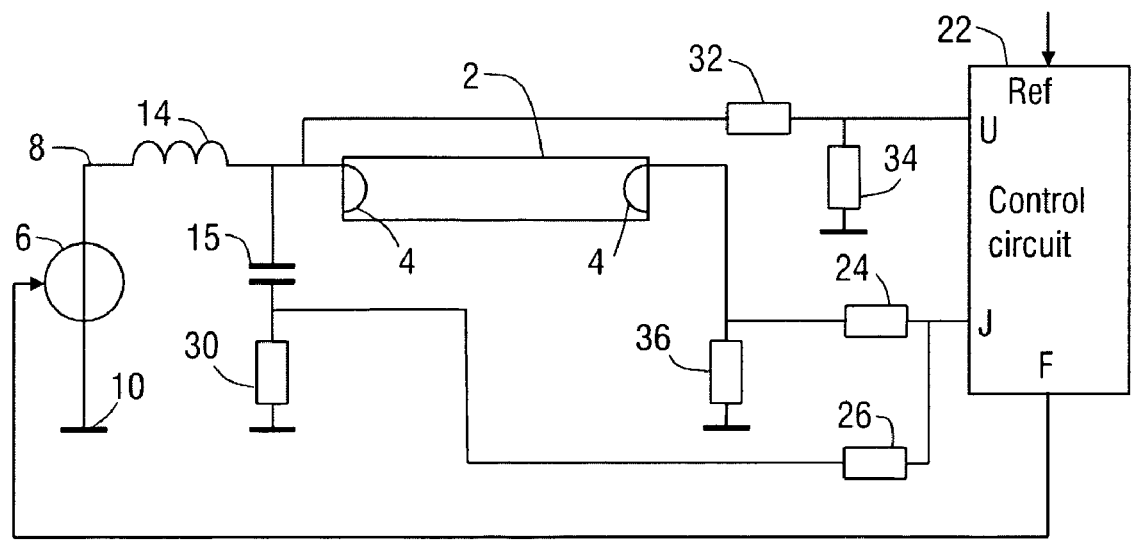
FIG. 2 shows a diagram of an embodiment of a ballast circuit shown in FIG. 1 in greater detail.

FIG. 2 shows a diagram of an embodiment of the ballast circuit of FIG. 1 in greater detail.

The voltage sensor 16 comprises just a shunt resistor 30. The voltage sensor 18 comprises a voltage divider of a resistor 32 and a resistor 34. A node of resistors 32 and 34 is connected to input U of control circuit 22.

The current sensor 20 comprises a resistor 36. A current flowing through the lamp 2 will develop a voltage across resistor 36. Said voltage is coupled to input J of control circuit 22 to represent said lamp current.

As indicated above resistor 26 may be coupled between input J of control circuit 22 and the first cathode 4 of lamp 2, resulting in the multiplication, after rectifying by control circuit 22, of $P=V*(I+V2)$. If resistor 26 is coupled between input J of control circuit 22 and the node of capacitor 28 and resistor 30, the voltage V2 sensed through resistor 26 will be 90 degrees out of phase with the voltage V sensed through voltage sensor 18. As a result, the contribution of the term V2 is made still smaller during normal operation.

The ballast circuit according to the invention as described above provides a simple and low cost solution for increasing the lifetime of a fluorescent lamp which is turned off and re-ignited with a high pace by using just one control loop.

Although the invention is described with reference to the drawings showing embodiments of the invention, it must be clear that within the scope of the accompanying claims changes and modifications can be made by a skilled person. For example, the voltage sensor 18 and the current sensor 20, can be modified without intervening with the invention. Further, instead of measuring the voltage at the first cathode 4 of the lamp 2 it may be measured at the output of generator 6. It may also be measured between both cathodes of the lamp 2, in stead with reference to mass 10. The latter also applies for the voltage V2 that is coupled to input J of the control circuit 22. Still further, several functions can be implemented by hardware or by using a combination of hardware and software. Examples thereof are integrated circuits UBA2021 and UBA2010, manufactured by Philips, which can be used to implement generator 6 and control circuit 22, respectively. In this regard it is noted that a phase shift of V2 with respect to V can be obtained also by delaying the voltage V2 derived from the alternating voltage V by using storage means and software. It must also be noted that the partly real and simulated lamp power value $P=V*(I+V2)$ can be calculated as such or by applying $P=V*I+V*V2$.

The invention claimed is:

1. Method for supplying a fluorescent lamp (2) comprising:
   a. during an ignition state and during a normal operation state generating an alternating voltage;
   b. applying the alternating voltage across a pair of a first and a second cathodes (4) of the lamp;
   c. measuring the amplitude of the alternating voltage (V) across the lamp for providing a measured voltage value;
   d. measuring a current (I) through the lamp for providing a measured current value;
   e. multiplying the measured voltage value and the measured current value to provide a value of the real lamp power (V*I);
   f. comparing the lamp power value to a reference value to provide an error signal;
   g. dependent on the error signal controlling the frequency and the amplitude of the alternating voltage, such as to minimize the error signal; characterized by, h. deriving a derived voltage value (V2) from the alternating voltage;

i. multiplying the measured voltage value and the derived voltage value to provide a simulated lamp power value (V*V2);

j. adding the real power value to the simulated lamp power value to provide a combined power value (P=V*I+V*V2);

k. carrying out the comparing step between the combined power value and the reference value.

2. Method according to claim 1, characterized in that, the derived voltage (V2) is phase shifted with respect to the alternating voltage (V) applied to the lamp (2).

3. Ballast circuit of a fluorescent lamp (2), comprising a generator (6) for generating an alternating voltage, an inductor (14) in series with the lamp and the generator for applying the alternating voltage to a first cathode (4) of the lamp, a capacitor (15) connected across the lamp, a control circuit (22), a voltage sensor (18) connected across the lamp for sensing an amplitude of the alternating voltage (V) and to supply a measured voltage signal to a first measurement input (U) of the control circuit, a current sensor (36) for sensing a real lamp current (I) through the lamp and to supply a measured real lamp current signal to a second measurement input (J) of the control circuit, the control circuit comprising a multiplier for multiplying signals received at the measurement inputs (U, J), a reference input (Ref) of the control circuit being connected to receive a reference signal which represents a wanted lamp power, the control circuit further comprising a comparator for comparing an output value of the multiplier and a value of the reference signal to provide an error value, and an output (F) of the control circuit being connected to supply a control signal to the generator for controlling the frequency and the amplitude of the alternating voltage, such that the error value is minimized, characterized in that, the second measurement input (J) of the control circuit is coupled to receive in addition to the measured real lamp current signal a voltage (V2) which is derived from the alternating voltage (V).

4. Ballast circuit according to claim 3, characterized in that, the derived voltage (V2) is derived through a phase shifting circuit.

5. Ballast circuit according to claim 4, characterized in that, the phase shifting circuit comprises a series circuit of the inductor (14), the capacitor 15 and a resistor (30), with the series circuit being connected in parallel to the generator (6).

* * * * *